Oct. 4, 1927.
P. A. FISCHER
GARTERED HOSIERY
Filed Aug. 6, 1923
1,644,185
3 Sheets-Sheet 1
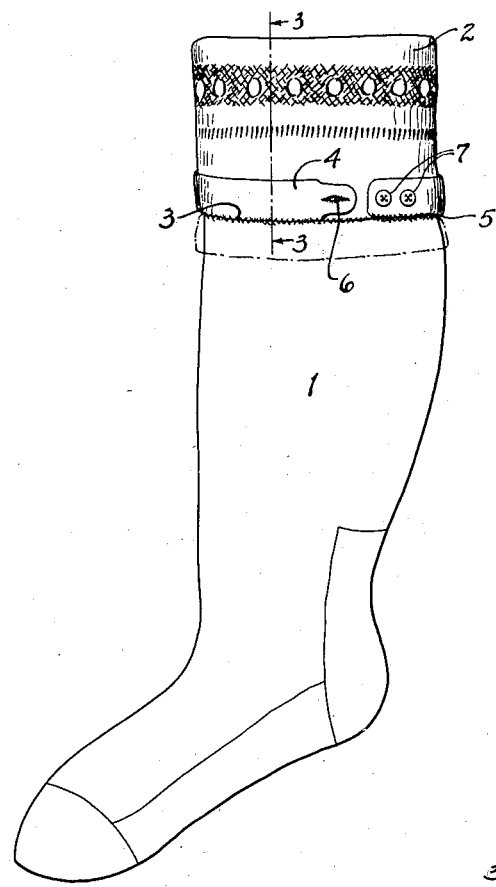
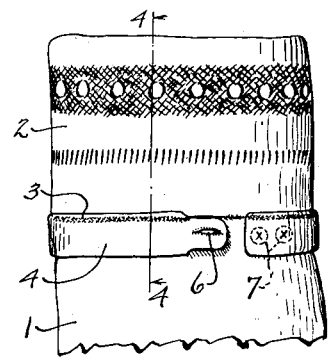
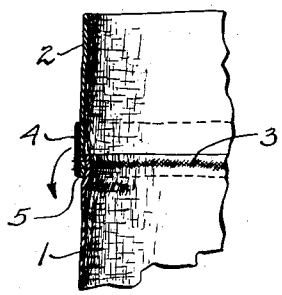
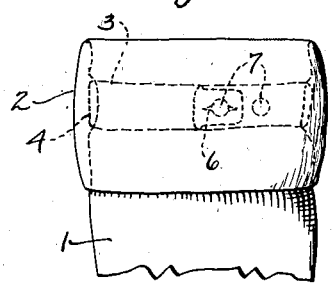
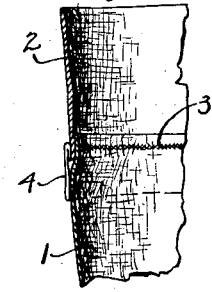
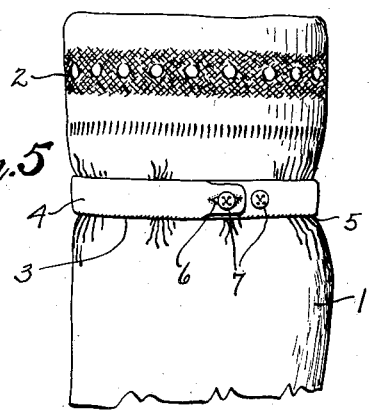
INVENTOR
Philip A. Fischer
BY Martin T. Fisher
ATTORNEY Oct. 4, 1927.  1,644,185
P. A. FISCHER
GARTERED HOSIERY
Filed Aug. 6, 1923   3 Sheets-Sheet 2
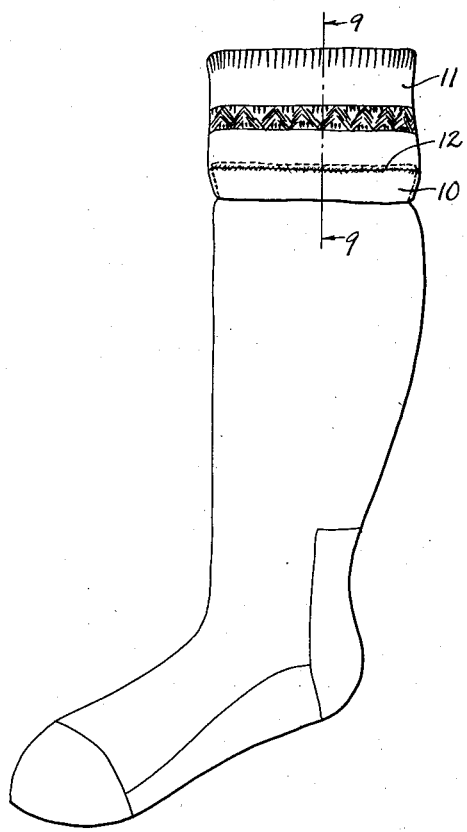
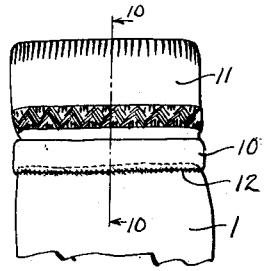
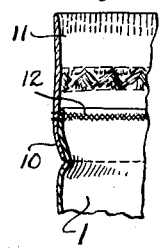
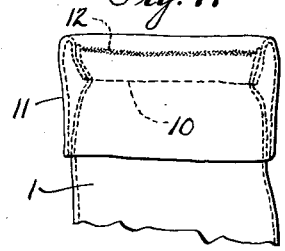
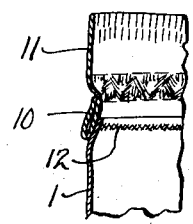
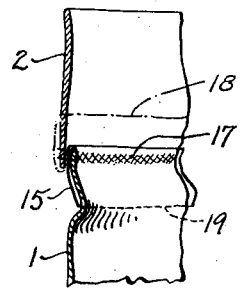
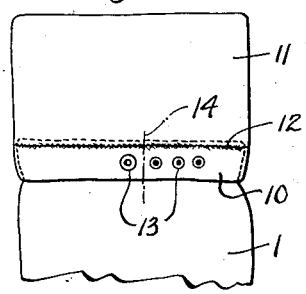
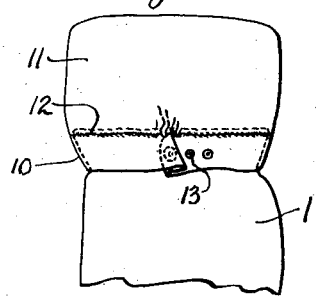
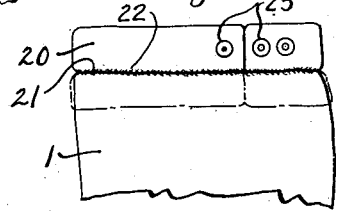
INVENTOR
Philip A. Fischer
BY
Martin T. Fisher
ATTORNEY

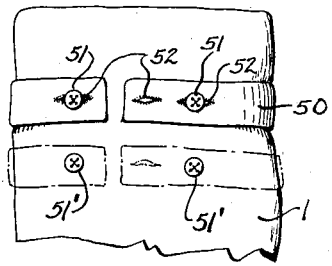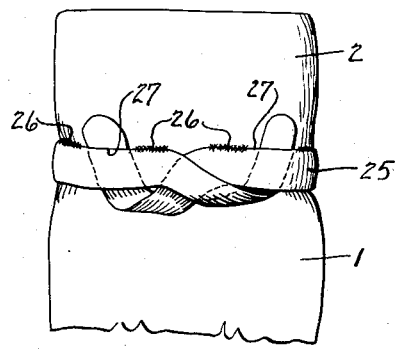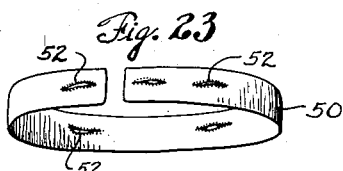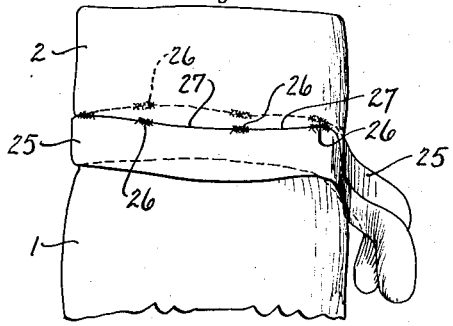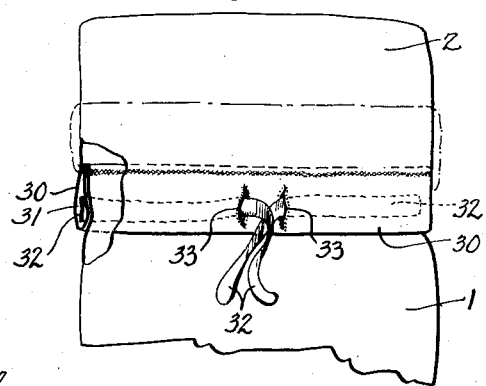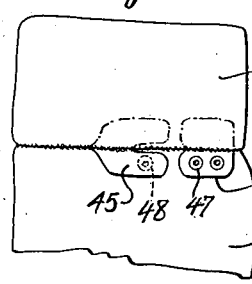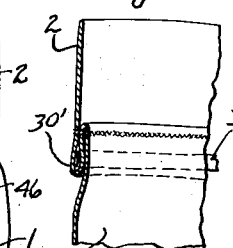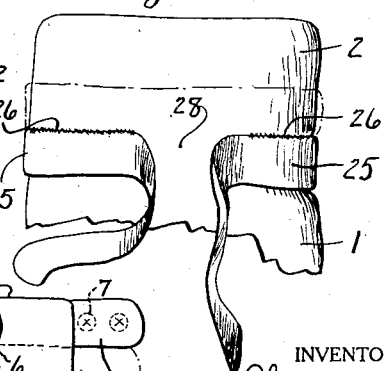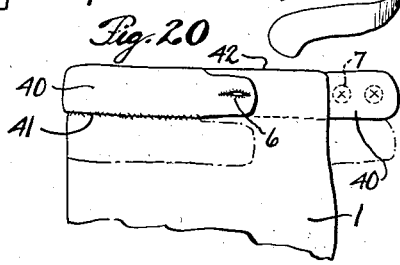

Patented Oct. 4, 1927.

1,644,185

UNITED STATES PATENT OFFICE.

PHILIP A. FISCHER, OF NEW YORK, N. Y.

GARTERED HOSIERY.

Application filed August 6, 1923. Serial No. 655,844.

This invention is a garter applicable to all forms of hosiery.

The garter is of the band type that imposes a circumferential restricting force around the leg of the wearer; it may or may not completely encircle the leg.

The garter is attached to the stocking more or less permanently, so that it becomes practically a part thereof. Permanently attached garters present the disadvantage that since they are attached to the stocking, they can occupy only one position with respect to the leg of the wearer. And since legs of different individuals vary in length, this means that where a stocking with its attached garter will have the garter at the right height for one person, it will not be at the right height for another.

According to this invention the garter may be positioned at a plurality of levels—preferably two—so that it will fit a long or short leg.

Furthermore, a wool stocking, such as a golf stocking, is liable to shrinkage after washing. With the ordinary attached garter, this shrinkage would cause an improper positioning of the garter with respect to the leg; with this invention, the shrinkage is readily compensated for by positioning the garter at another level.

The invention is applicable to socks, stockings, golf hose and hosiery in general. The term "stocking" as used in the claims is intended to include hosiery in general, such as is commonly worn by men, women and children.

The garter may be of one, two or more plies, as desired, and made of fabric, elastic or other suitable material. In some cases, it may be woven or knitted integral with the body of the stocking, or integral with the cuff of a golf stocking.

The invention may be carried out in a number of different ways some of which are illustrated in the accompanying drawings. In the present preferred embodiment, the garter is attached to the stocking along a substantially horizontal line, and preferably along the upper or lower edge of the garter. The garter may be attached continuously along this line, or at spaced points therealong. The garter may be swung upwardly or downwardly, as desired, about this line of attachment, for positioning it at an upper or lower level. Any desired form of means for varying the effective length of the garter may be used.

In a modified form, the garter may be fastened at different levels to the stocking by attaching it to securing devices carried by the stocking at such levels.

With golf stockings, a cuff is usually separately attached to the body of the stocking by a row of stitching. When my invention is used with such a stocking, the cuff and garter are preferably, stitched in place simultaneously, the same stitching serving to secure the cuff and garter in place.

Furthermore, with golf stockings, a commonly used form of garter is a simple woolen band the ends of which are frictionally interengaged, the friction between the rough woolen surfaces being sufficient to hold the ends. In applying my invention to this form of garter, the band may be sewed to the stocking along one edge, leaving the ends sufficiently free for interengaging them without knotting; preferably, however, the edge of the band is attached at intervals to the stocking, the unattached portions defining pockets into which the ends of the garter may be tucked and held very satisfactorily and securely by friction due to the interengagement of the fibres of the wool.

Other advantages of my invention will be apparent from the following more detailed description of several possible embodiments of the invention taken in connection with the accompanying drawings, which it should be understood are merely illustrative of the invention.

In the drawings, Fig. 1 shows a golf stocking with my improved garter applied thereto, with the garter in the upper position.

Fig. 2 is a similar view with the garter in the lower position.

Fig. 3 is a section on the line 3—3 of Fig. 1.

Fig. 4 is a section on the line 4—4 of Fig. 2.

Fig. 5 is a view similar to Fig. 1 showing the garter in securing position.

Fig. 6 shows the cuff of the stocking turned over the garter to conceal it.

Figs. 7 and 8 are side views of a modification, with the garter in lower and upper position, respectively.

Fig. 9 is a section on line 9—9, Fig. 7.

Fig. 10 is a section on line 10—10, Fig. 8.

Fig. 11 shows the cuff turned down over the garter when in use.

Figs. 12 and 13 show a modified form of Fig. 7.

Fig. 14 is a section of a modification.

Fig. 15 shows another modification.

Figs. 16, 17 and 18 are modifications showing the use of a woolen strip as a garter on golf stockings.

Figs. 19 and 20 show other modifications.

Fig. 21 shows constricting tabs serving as garters.

Figs. 22 and 23 show a modification where the garter is detachable from the stocking.

Fig. 24 is a modification where the garter is integral with the stocking.

Referring now to those drawings, in which similar reference characters are used to designate similar parts, 1, Fig. 1, indicates the body of a stocking, here a golf stocking. To the upper part of the stocking is attached the usual cuff 2 by stitching 3. Suitably attached to the upper part of the stocking is a garter 4 of the band type; this garter is secured to the stocking with a horizontally extending row of stitches, preferably along one edge. As shown, an edge 5 of the garter is secured to the stocking and preferably is secured by the same stitches 3 that attach the cuff, so that both the cuff and garter may be attached at one operation, thereby economizing labor.

The ends of the garter 4 are provided with any suitable devices for varying the effective length of the garter. As shown, one end has a buttonhole 6 and the other a plurality of buttons 7. Various forms of snap fasteners, buckles and other known devices could evidently be used for varying the effective length of the garter.

The garter 4 may be positioned at either of two levels, and is fully operative for holding up the stocking, and for obtaining any desired adjustment, at either level. The garter as shown in Fig. 1 is at the upper level. To move it to the lower level, it is simply swung downwardly and outwardly about the row of stitches 3 as a pivot to the lower level, as shown in Fig. 2. The variable length devices 6 and 7, or their equivalents, are still operative at the lower level.

As mentioned above, the positioning of the stocking at two levels gives an adjustment whereby it will fit legs of different length, whereby it may be positioned on a leg of a given length at a point where it will be most efficient and comfortable, and whereby shrinkage of the stocking may be compensated for.

In Figs. 5 and 6 the garter is shown in securing position; Fig. 6 shows the cuff 2 turned down over the garter to conceal it, as it would actually be worn.

In Figs. 7–10, the garter 10 is a continuous band, woven or knitted integral with the cuff 11 and of a circumference smaller than the circumference of the stocking so as to impose a restricting force on the stocking. Stitching 12 secures the cuff and the garter to the stocking. In Figs. 7 and 9 the garter is in its lower position; in Figs. 8 and 10, it is in its upper position. Fig. 11 shows the cuff turned down over the garter to conceal it, as in actual use.

In Figs. 12 and 13, the band 10 carries a plurality of snap fasteners 13, which may be used as in Fig. 13 to vary the effective length of the garter. The band 10 may, if desired, be cut along the line 14, for facilitating overlapping.

In Fig. 14, the garter 15 is a continuous elastic band containing rubber or the like, and is attached to the stocking 1 by stitches 17 which at the same time secure the cuff 2 to the stocking. The garter is here placed between the cuff and stocking. The dotted lines 18 and 19 indicate the upper and lower positions, respectively, of the garter.

In the modification shown in Fig. 15, the garter 20 is stitched to the top 21 of the stocking 1 by stitches 22. The ends of the garter are provided with a plurality of variable length adjusting elements 23 of any desired form. The garter is shown at the upper position, the dotted lines indicating its position when at a lower level.

In Fig. 16, the invention is shown as applied to the woolen band commonly used as a garter for golf stockings. The band 25, preferably of wool, but not necessarily so, is stitched along one edge of the stocking 1 by stitching 26; the stitching however is not continuous, whereby pockets 27 are formed between the band and the stocking into which the ends of the garter may be tucked and where they will be securely and satisfactorily held due to the friction between the fibers of the wool. In Fig. 17 the stitching 26 is only at spaced intervals all the way around the stocking. In Fig. 18, no pockets are used, the stitching 26 however leaving a fairly wide unsecured part at 28 useful in interengaging the ends of the band 25 in any desired manner. In each of these forms, the band is swingable up and down about the stitching 26 for positioning at an upper or lower level.

In the modification shown in Fig. 19, the garter 30 is shown as U-shaped in cross-section defining a circumferential pocket 31 in which an adjusting tape or string 32 is threaded. The ends of the tape pass out through apertures 33, whereby they may be tied together at any desired point to give the desired constricting effect to the garter.

When the garter is in its upper position, the ends of the tape 32 will of course pass outwardly through another pair of apertures (not shown) opposite apertures 33. Garter 30 may be integral with the cuff 2, or not, as desired.

In the modification shown in Fig. 20, the garter 40 is stitched to the stocking 1 by stitches 41 along one edge, so that the upper edge of the garter, when the garter is in its upper position, is flush, or substantially so, with the top 42 of the stocking. Dotted lines indicate the position of the garter in its lower position. Any desired form of securing devices for varying the effective length of the garter may be used.

In the modification shown in Fig. 21, tabs 45 and 46 are stitched along one edge of the stocking by stitches. The tabs are provided with cooperating fastening elements 47 and 48, for securing the tabs in desired position. The tabs are drawn together or moved apart and fastened in the position for giving the necessary constricting effect on the stocking. The tabs are swingable to an upper position, as indicated by the dotted lines, whereby they may be positioned at two levels.

In Figs. 22 and 23, the garter 50 is entirely removable from the stocking 1. Securing devices, here shown as buttons, are carried by the stocking 1 at a plurality of levels, the upper level being shown at 51 and the lower level at 51'. A plurality of buttonholes 52 are formed in the garter 50, which serve the double purpose of securing the garter to the stocking at the desired level, and of varying the effective length of the garter for varying its constricting force. Other means for securing the garter at various levels and for varying the effective length of the garter, could of course be used.

The modification shown in Fig. 24 is somewhat similar to the structure of Fig. 19, the garter, however, being woven integrally with the stocking, instead of separately, as in Fig. 19. The garter 30' forms a loop inside of which a band or ribbon is threaded, the ends of which may be tied in adjusted positions, as in Fig. 19.

It should be understood that while various forms of the invention have been described in detail, the invention is not to be limited to these disclosures, but may be carried out in other ways as falling within the scope of the following claims.

I claim as my invention:—

1. The combination of a stocking, means attached to the stocking and swingable up and down about the point of attachment, for imposing a circumferential restricting force on the stocking, and means for varying the effective length of said first mentioned means.

2. The combination of a stocking, means attached to the stocking along one of its edges, and swingable up and down about its attached edge, for imposing a circumferential restricting force on the stocking, and means for varying the effective length of said first mentioned means.

3. The combination of a stocking, a garter attached to the stocking and extending around it and swingable up and down about the point of attachment, and means for varying the effective length of the garter.

4. The combination of a stocking, a garter attached to the stocking and extending around it along one of its edges, whereby it is swingable up and down about its attached edge, and means for varying the effective length of the garter.

5. The combination of a stocking, and a garter attached to the stocking below the upper edge of the stocking along a substantially horizontal line and swingable up and down about its line of attachment.

6. The combination of a stocking, a garter attached to the stocking at intervals along a substantially horizontal line forming securing pockets and swingable up and down about its line of attachment, and means for varying the effective length of the garter.

7. A combination of a stocking, a garter having two ends attached to the stocking at intervals along a substantially horizontal line, whereby securing pockets are formed for the ends of the garter.

8. A combination of a stocking, a garter attached thereto at intervals along a substantially horizontal line, and swingable up and down about its line of attachment, the unattached portions of the garter defining pockets for receiving the ends of the garter.

9. The combination of a stocking, an elongated member, having two ends, extending around the stocking and attached along one of its edges, intermediate its ends, to the stocking, and positionable at different levels on the stocking, the ends of the elongated member being engageable for imposing a circumferential restricting force around the stocking.

10. The combination of a stocking, an elongated member, having two ends, extending around the stocking and attached along one of its edges, intermediate its ends, to the stocking, and positionable at two levels on the stocking by swinging it up or down about its points of attachment to the stocking, and means for varying the effective length of the elongated member.

11. The combination of a stocking, a garter having two ends, attached intermediate its ends to the stocking and extending around it entirely on the outside thereof, and positionable thereon at different levels by swinging it up or down about its point of attachment to the stocking, and means for varying the effective length of the garter in either the upper or lower position, by variably positioning the ends with respect to each other.

12. The combination of a stocking, and a circumferentially extending garter attached to the stocking and located entirely on the outside of the stocking and below its upper edge, the garter being swingable up and down about the point of attachment, and means for varying the effective length of the garter when in either its upper or lower position, whereby it may be used as a garter in either position, according to the leg length of the wearer.

13. The combination of a stocking and a circumferentially extending garter attached to the stocking, the garter being swingable up and down about its attachment to the stocking and useable as a garter at either of two different levels, for accommodating the leg length of the wearer.

PHILIP A. FISCHER.